United States Patent [19]

Suzuki

[11] 3,760,008

[45] Sept. 18, 1973

[54] RESORCINOL PROCESS

[75] Inventor: Shigeto Suzuki, San Francisco, Calif.

[73] Assignee: Chevron Research Company, San Francisco, Calif.

[22] Filed: Jan. 22, 1970

[21] Appl. No.: 5,121

[52] U.S. Cl. ......... 260/621 R, 260/629, 260/650 R, 260/529 M
[51] Int. Cl. ............................................. C07c 29/00
[58] Field of Search ...................... 260/621 R, 629

[56] References Cited
UNITED STATES PATENTS

| | | | |
|---|---|---|---|
| 1,737,842 | 12/1929 | Hale et al. | 260/621 R |
| 3,089,905 | 5/1963 | Wygant | 260/621 R |
| 2,852,567 | 9/1958 | Barnard et al. | 260/621 R |
| 2,727,924 | 12/1955 | Pearlman | 260/621 R X |
| 2,727,926 | 12/1955 | Kaeding et al. | 260/621 R |

OTHER PUBLICATIONS

Moller, "Chem. of Org. Comp.," 3rd edition, pp. 492–493 (1965), QD253.N65.

Moller, Ibid p. 602.

*Primary Examiner*—Leon Zitver
*Assistant Examiner*—Norman Morgenstern
*Attorney*—John Stoner, Jr., G. F. Magdeburger, D. L. Hagmann and J. A. Buchanan, Jr.

[57] ABSTRACT

Resorcinol is produced from the alkali metal salts of symmetrical dichloroisophthalic acid by heating the salt at an elevated temperature in the presence of a limited amount of water.

9 Claims, No Drawings

RESORCINOL PROCESS

FIELD OF INVENTION

This invention relates to a process for the production of resorcinol, particularly from alkali metal salts of 2,4- and/or 4,6-dichloroisophthalic acid.

BACKGROUND OF THE INVENTION

It is known in the art to prepare resorcinol by the caustic fusion of the salts of 1,3-benzene disulfonic acid. There are a number of disadvantages incidental to this fusion reaction system including mixing problems, poor heat transfer, and the like. Dilution with water does not lessen these problems, for the addition of water adversely effects the desired reaction.

THE INVENTION

It has now been found that resorcinol can be prepared by heating a mixture of an alkali metal salt of 2,4- and/or 4,6-dichloroisophthalic acid, alkali metal hydroxide and water at a temperature in the range from about 150°C. to 250°C., preferably 190°C. to 210°C. for a period in the range from about 0.2 to 2 hours, and acidifying the resulting reaction product mixture. Preferably the reaction is promoted by the presence of a copper catalyst in the reaction mixture. Surprisingly, the presence of water in the reaction mixture does not adversely affect the reaction provided that the relative amount added is not too great. It appears on a molecular basis that the amount of water in the reaction mixture should not materially exceed the amount of the base and that the presence of a large relative amount of water operates detrimentally by reducing the basic strength of the hydroxide in the reaction mixture. For each mol of the salt, the reaction mixture should contain an amount of the hydroxide in the range from about 4 to 20 mols, preferably 6–14 mols. Although the amount of water which can be tolerated in the instant process is small, nevertheless, it is sufficient to alleviate the aforementioned problems incidental to the ordinary fusion reaction system.

The production of resorcinol by the present process is surprising in view of the art. U.S. Pat. No. 2,439,237 discloses that the treatment of polyhalo-substituted phthalic acid with a base yields polyhalobenzoic acid or polyhalobenzene. Apparently, in view of the present discovery, the geometric relationship of the carboxyl groups of a halo-substituted benzene dicarboxylate salt or acid drastically alters the course of and the products from displacements on aromatic carbon atoms. The products obtained from halo-substituted phthalates (ortho carboxyl relationship) are different from those obtained from halo-substituted isophthalates (meta carboxyl relationship). The former yield halo-substituted benzoic acid and/or halo-substituted benzene, whereas the latter yields resorcinol.

A further conflicting factor in the present displacement reactions on aromatic carbon in addition to the aforementioned geometric effect is associated with the pH of the reaction medium. Apparently pH plays an important role in displacements on aromatic carbon atoms of functional groups. U.S. Pat No. 3,413,341 discloses that in halogen displacements on poly-functional substituted aromatic compounds effected at a pH below 7, halogen is displaced by hydroxyl and, where present, carboxyl groups are retained. The production of resorcinol as in the present process is consequently an unexpected albeit very useful result.

Resorcinol is a well known article of commerce. The 2,4- and 4,6-dichloroisophthalic acids on the other hand, while not of particular commercial importance, are readily available from the corresponding dichloro-meta-xylenes (see, for example, U.S. Pat. No. 2,881,224) by conventional reactions such as the potassium permanganate, aqueous nitric acid and the like oxidations.

PREFERRED EMBODIMENT

Dichloroisophthalic acid, aqueous sodium hydroxide, and cuprous oxide are charged to a pressure autoclave fitted for mixing. The amounts of each component are proportioned to yield a reaction mixture having the relative molecular amounts of dichloroisophthalate salt, sodium hydroxide, water and copper catalyst of 1:13:13:0.16, respectively. Under an atmosphere substantially free of oxygen (see U.S. Pat. No. 2,762,838) the autoclave plus charge in the liquid phase are heated at a temperature of 200°–210°C. for about one hour. The resulting reaction mixture is then cooled and acidified by dissolving carbon dioxide gas in the mixture. The liberated resorcinol is then removed by extraction with a suitable organic solvent, for example ethyl ether, and recovered by distillation.

The aqueous solution remaining after removal of the resorcinol contains a minor amount of reaction intermediates, mainly monochlorohydroxybenzene carboxylates and sodium bicarbonate from the main reaction (two moles of sodium bicarbonate for each mol of resorcinol produced) and from excess sodium hydroxide. This solution is regenerated for recycle to the process by the addition of calcium oxide and filtration to remove the insoluble carbonate formed in the regeneration stage as well as some of the sodium chloride, i.e., that amount in excess of solubility. After additions of the base and water to adjust for mechanical losses in the processing, the regenerated caustic medium is recycled to the process. The conversion of the feed is about 90–95 mol percent and the yield is 95–98 mol percent.

THE REACTION EQUATIONS

The chemical conversions effected in the process of the invention may be summarized as follows:

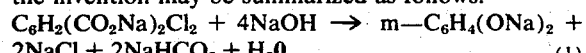
$C_6H_2(CO_2Na)_2Cl_2 + 4NaOH \rightarrow m\text{---}C_6H_4(ONa)_2 + 2NaCl + 2NaHCO_3 + H_2O$ (1)

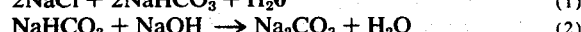
$NaHCO_3 + NaOH \rightarrow Na_2CO_3 + H_2O$ (2)

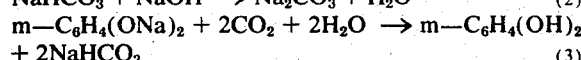
$m\text{---}C_6H_4(ONa)_2 + 2CO_2 + 2H_2O \rightarrow m\text{---}C_6H_4(OH)_2 + 2NaHCO_3$ (3)

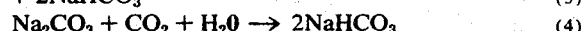
$Na_2CO_3 + CO_2 + H_2O \rightarrow 2NaHCO_3$ (4)

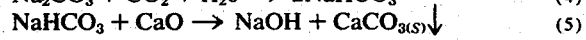
$NaHCO_3 + CaO \rightarrow NaOH + CaCO_{3(s)}\downarrow$ (5)

TEMPERATURE

The instant process may be carried out over a range of temperature with the usual reaction rate effect, i.e., the rate doubles for about each 10°C. incremental increase. At 150°C. there is an appreciable rate of resorcinol production. In the range 240°–270°C., on the other hand, one or more side reactions are experienced in which resorcinol is converted to undesirable by-product(s). Best results, in general, obtain at a temperature in the range 190°C.–210°C. after a period of about one hour. Satisfactory reaction temperatures in general are in the range above 150°C. and below 240°–270°C.

HYDROXIDE REACTANT

In order to effect the displacement of chloride and carboxyl (decarboxylation) groups herein an exceptionally strong basic medium is required. The alkali metal hydroxides in general satisfy this need. In particular sodium, potassium and lithium hydroxides and mixtures thereof are useful. For reasons of cost sodium hydroxide is preferred.

For each mol of the dichloroisophthalate salt present in the reaction mixture (see equation 1 above), at least 4 mols of the alkali metal base is necessary for the satisfaction of the stoichiometric requirement. A substantial excess of the base should be present in order to reduce a polymer producing side reaction to a satisfactory level. For this purpose for each mol of salt feed at least 6 mols of base should be present. Best results in general obtain when the amount of the base is in the range 10–14 mols per mol of the dichloroisophthalate. Larger relative amounts, for example as much as 20 mols and more, may be employed.

ACIDIFICATION

Acids in general having an acid strength greater than resorcinol are suitable for the liberation of resorcinol from its alkali metal salt. Mineral acids are satisfactory because of the low cost. However, carbon dioxide (carbonic acid) is preferred as an acidifier because its use permits regeneration of the excess alkali metal hydroxide and an easy control of pH in the range 6–7 (see reaction equations above). This pH is sufficient to free resorcinol but does not liberate minor amounts of unconverted carboxylate salt feed or intermediates which may be present in the acidified reaction product mixture.

WATER DILUENT

From an inspection of equation 1 above, water does not appear to be a reactant in the reaction system. However, in the absence of water the results are poor and the processing is difficult. Mixing and local overheating effects in particular are not good. At least about 0.5 mol of water per mol of hydroxide should be present in the mixture. An excess of water relative to the hydroxide, on the other hand, adversely affects the desired reaction. When the mol ratio of water to hydroxide exceeds about 1 to 1, the results become progressively poorer as the ratio becomes larger. From this fact, it is inferred that amounts of water substantially in excess of a 1:1 ratio reduces the basicity of the hydroxide reagent. Useful results are achieved when the water to hydroxide ratio is below about 9, but for satisfactory conversions of the dichloroisophthalate salt to resorcinol, this ratio should not exceed about 3–5; and, in general, for best results for each mol of hydroxide in the reaction mixture, the amount of water should be in the range 1 to 3 mols, preferably one mol of water.

Along with water, if desired, methanol and ethanol may be added to the reaction system as diluents. However, because of the relatively lower boiling points of these alcohols, their presence in the system results in higher system pressures. Similarly, dimethylsulfoxide may also be used as a diluent (see for example U.S. Pat. No. 3,481,991) for the present displacement reaction, but such use complicates the resorcinol recovery stage and hence is not a preferred mode.

REACTION PROMOTERS

Resorcinol is produced by the process herein in the absence of catalysts. The presence in the reaction medium of a copper compound, however, is beneficial. Copper compounds, in general, which convert to oxide(s) of copper in the presence of strong alkali metal hydroxides are useful promoters for the reaction. Thus representative promoters suitable for use herein include cuprous oxide, the copper chlorides, carboxylates, nitrates, sulfates, acetates, and the like copper compounds.

Trace amounts of copper oxide are beneficial. Satisfactory amounts are in the range 0.01 to 0.25 mol per mol of the dichloroisophthalate salt. Larger relative amounts may be used, but cost becomes a factor. The preferred range is 0.05 to 0.2 mols of promoter (based upon copper) per mol of the dichloroisophthalate feed.

The following examples are for the further illustration of the invention.

DICHLORO-M-XYLENE

Example 1 m-Xylene was chlorinated by introducing chlorine gas into m-xylene containing about 5 weight percent (based upon m-xylene) of ferric chloride while maintaining the reaction temperature at about 20°C. After the addition of 1.8 equivalents of chlorine per mol of the xylene, the optimum yield, about 67 mol percent of dichloro-m-xylene, was produced. Separation and recovery of the dichloro derivative by distillation completed the preparation. The product was a mixture which was 70 percent 4,6- and 30 percent 2,4-dichloro-m-xylene.

DICHLORO-ISOPHTHALIC ACID

Example 2

Dichloroisophthalic acid was prepared by liquid phase oxidations of dichloro-m-xylene produced as in Example 1. In one method, the isomeric dichloroxylene product was treated with aqueous permanganate. A mixture of 68 g. of the dichloro-m-xylene produced as in Example 1 and 2500 ml water was oxidized at reflux for 67 hours with incremental additions of potassium permanganate, 364 g. total. The usual work-up of the reaction mixture gave 5.6 g. of unreacted dichloro-m-xylene (92 percent conversion) and 80.2 g. of mixed dichloroisophthalic acid in two crops (97 mol percent yield).

Examples 3–10

In these examples 2,4- and/or 4,6-dichloroisophthalic acid (DCIP), sodium hydroxide, a catalyst and water were charged to a pressure autoclave in the relative amounts and under the conditions noted in the table below. The resorcinol produced was recovered by acidifying the resulting product mixture and identified by the use of appropriate chemical standards for the analytical determinations.

TABLE

| Example No.: | Na₂DCIP [1] Mols | Na₂DCIP [1] Type | NaOH mols | Ratio Base: Na₂DCIP | H₂O mols | Ratio H₂O: Base | Catalyst wt., percent [2] | Temp., °C. | Time, min. | Conversion, percent | Yield resorcinol mol, percent |
|---|---|---|---|---|---|---|---|---|---|---|---|
| 3 | 0.05 | (³) | 0.25 | 5.0 | 2.2 | 4.0 | | 250 | 30 | 83 | 32 |
| 4 | 0.10 | 4,6— | 0.60 | 6.0 | 3.0 | 5.0 | Cu₂O, 10 | 200–208 | 45 | 90 | 64 |
| 5 | 0.09 | 4,6— | 0.62 | 7.0 | 3.0 | 5.0 | Cu₂O, 10 | 200 | 60 | 94 | 67 |
| 6 | 0.08 | 4,6— | 0.50 | 6.2 | 2.5 | 5.0 | Cu₂O, 10 | 170–177 | 60 | 77 | 70 |
| 7 | 0.06 | 4,6— | 0.45 | 7.5 | 1.6 | 3.6 | Cu₂O, 10 | 225–229 | 30 | 94 | 51 |
| 8 | 0.10 | 4,6— | 1.30 | 13.0 | 3.6 | 3.3 | Cu₂O, 10 | 200–212 | 60 | 88 | 89 |
| 9 | 0.30 | 4,6— | 3.90 | 13.0 | 3.9 | 1.0 | Cu₂O, 10 | 200–212 | 60 | 89 | 96 |
| 10 | 0.10 | 2,4— | 1.30 | 13.0 | 3.5 | 2.7 | Cu₂O, 10 | 200–208 | 60 | 93 | 97 |

[1] Dichloroisophthalate.
[2] Based on DCIP.
[3] Mix = 70% 4,6— + 30% 2,4—DCIP.

The data in the above examples clearly establish that alkali metal salts of 2,4- and 4,6-dichloroisophthalic acid and mixtures thereof are effectively converted to resorcinol by the novel process herein described.

It is to be understood that my invention is in no way limited by the specific examples given herein and that many modifications and variations may be made without departing from the spirit and scope of my inventive contribution as set forth in the following claims.

I claim:

1. The process for the production of resorcinol which comprises reacting an alkali metal salt of dichloroisophthalic acid with an alkali metal hydroxide by heating a mixture of the reactants in the liquid phase in the presence of water wherein the acid is 2,4-, 4,6-dichloroisophthalic acid or mixtures thereof, wherein the heating is above about 150°C. and below about 270°C.; wherein for each mol of the salt, the mixture contains an amount of the hydroxide in the range from about 4 to 20 mols; and wherein for each mol of the hydroxide the mixture contains an amount of water in the range from about 0.5 to 20 mols; and acidifying the resulting reaction mixture.

2. The process as in claim 1 further characterized in that the reaction is promoted by copper oxide and that for each mol of the salt an amount of the copper oxide in the range from about 0.01 to 0.25 mol is present in the reaction mixture.

3. The process as in claim 1 further characterized in that the temperature is in the range from about 190°C. to 210°C., in that the amount of hydroxide is in the range from about 6 to 14 mols, and in that the amount of water is in the range from about 1 to 3 mols.

4. The process as in claim 3 further characterized in that the hydroxide is sodium hydroxide, in that the amount of the hydroxide is about 13 mols, in that the amount of water is one mol per mol of hydroxide, and in that the reaction is promoted by the presence in the mixture of about 0.16 mol of cuprous oxide per mol of the salt.

5. The process as in claim 1 further characterized in that carbon dioxide is used for the acidification.

6. The process for the production of resorcinol which comprises reacting the sodium salt of 4,6-dichloroisophthalic acid with sodium hydroxide by heating a mixture of the reactants, water, and copper oxide in the liquid phase at a temperature of about 200–212°C. for a period of about one hour, said mixture containing for each mol of the salt about 13 of the hydroxide, about 1 mol of water and about 0.16 mol of the oxide, and acidifying the resulting reaction product mixture.

7. The process as in claim 6 further characterized in that resorcinol is recovered from the resulting aqueous reaction mixture by:
   a. Acidifying the mixture with carbon dioxide; and
   b. Separating the resorcinol from the acidified mixture by extraction with ether.

8. The process as in claim 7 further characterized in that the aqueous residue remaining after the extraction is treated with calcium oxide, filtered, and used in a succeeding process cycle.

9. The process of claim 2 further characterized in that the copper oxide promoter is produced in situ.

* * * * *